No. 20,326. PATENTED MAY 25, 1858.
C. L. CLARKE.
DEVICE FOR ACTUATING THE INDEX OF HYGROMETERS.

UNITED STATES PATENT OFFICE.

C. L. CLARKE, OF ROCHESTER, NEW YORK.

DEVICE FOR ACTUATING THE INDEX OF HYGROMETERS.

Specification of Letters Patent No. 20,326, dated May 25, 1858.

*To all whom it may concern:*

Be it known that I, CHARLES L. CLARKE, of Rochester, in the county of Monroe and State of New York, have invented a new and useful Improvement in Hygrometers; and I do hereby declare that the following is a full, clear, and exact description of the same, reference being had to the accompanying drawings, forming part of this specification, in which—

Figure 1:
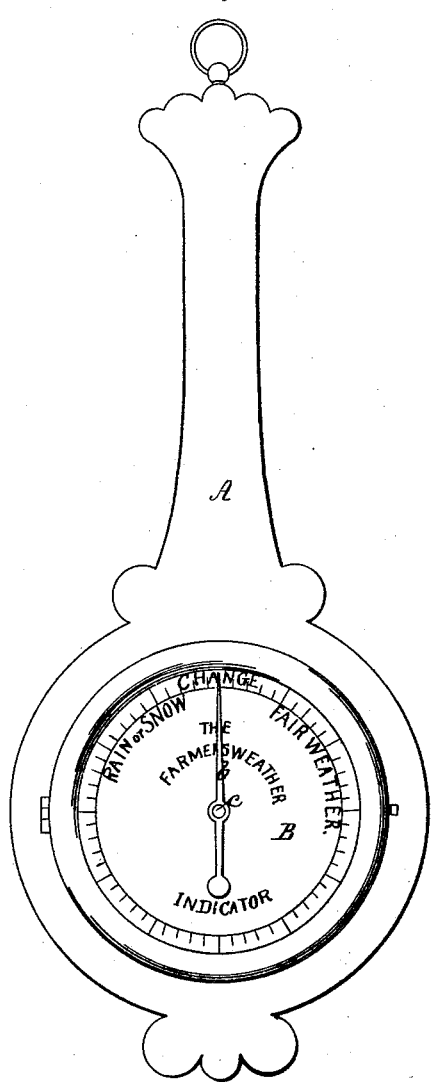
Figure 2:
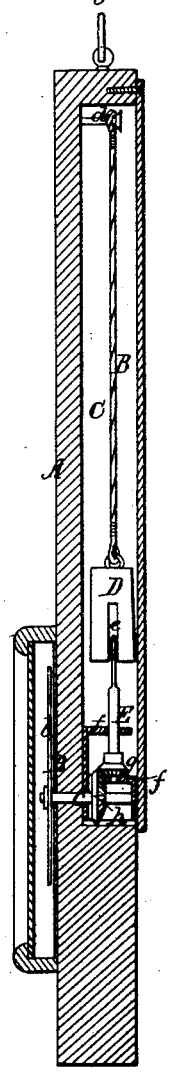

Figure 1 is a front view of the instrument. Fig. 2 is a vertical central section of the same, at right anges to Fig. 1.

Similar letters of reference indicate corresponding parts in both figures.

This invention relates to that description of hygrometer composed of a twisted cord of catgut or other substance which is caused to untwist and twist itself up by the increase or diminution of its bulk produced by changes in the hygrometric condition of the atmosphere.

My improvement consists in certain means of combining the cord with an index, whereby I am enabled to construct a hygrometer of this kind in a convenient form to serve as a weather glass.

To enable others to make and use my invention, I will proceed to describe its construction and operation.

A, is the case of the instrument, made in the form most commonly adopted for weather-glasses as shown in Fig. 1, and furnished with a ring $a$, or its equivalent by which to suspend it from a rail or hook in the wall of a house or from any convenient support. The front of this case is furnished with an upright dial B, which may be graduated and marked in any way considered best to indicate the state of the weather; and through the center of the dial there works a small horizontal shaft $c$, which carries an index $b$. In the case there is a cavity C, in which are arranged the twisted cord and the mechanism through which it acts upon the shaft $c$, of the indicator.

B, is the twisted cord, which I propose generally to make of cat-gut, attached at its upper end to a peg $d$, or otherwise secured at or near the upper part of the cavity C.

From this cord is suspended a weight D, sufficient to keep the cord stretched. In the bottom of this weight D, there is a slot $e$, in which is fitted loosely the flattened upper end of an upright shaft E, which is fitted to work in suitable bearings in small brackets $f$, $f$, within the case. This upright shaft is geared by a pair of level wheels $g$, $h$, with the index shaft $c$.

The unwinding and winding of the cord, produced by the increase or diminution of bulk consequent upon changes in the hygrometric condition of the atmosphere, turns the weight D, which turns the shaft E, and thus through the agency of the bevel gears $g$, $h$, turns the index shaft and moves the index over the face of the dial. The connection of the cord with the index-gearing by means of the weight D, which is fitted to slide up and down freely on the shaft E, but not to turn independently of the said shaft, maintains a uniform tension of the cord and yet provides for the variation in its length consequent upon the absorption of moisture by or evaporation from it, and prevents any strain or other impediment to the proper working of the index gear, which is enabled to work with the same degree of freedom in all conditions of the atmosphere; and it is by the use of the weight so applied, and the employment of the bevel gearing, that I am enabled to construct this kind of hygrometer in the convenient form represented.

I do not claim to have invented the employment of a twisted cord, operating on the principle described to indicate the hygrometric condition of the atmosphere. But

What I claim as my invention, and desire to secure by Letters Patent, is:

The combination of the slotted weight D with the shaft E, as herein shown and described, whereby shaft E is actuated by the horizontal rotation of weight D, without obstructing the vertical movement of the latter.

C. L. CLARKE.

Witnesses:
 FRED. DE LANO,
 B. F. CARSON.